US008397867B2

(12) United States Patent
Benefield

(10) Patent No.: US 8,397,867 B2
(45) Date of Patent: Mar. 19, 2013

(54) TREE STAND ADAPTED TO CREATE A SPIRAL STEP AROUND A TREE

(76) Inventor: Cretice Gary Benefield, Cornelius, NC (US)

( * ) Notice: Subject to any disclaimer, the term of this patent is extended or adjusted under 35 U.S.C. 154(b) by 162 days.

(21) Appl. No.: 13/032,123

(22) Filed: Feb. 22, 2011

(65) Prior Publication Data

US 2012/0211306 A1    Aug. 23, 2012

(51) Int. Cl.
*A01M 31/02* (2006.01)
(52) U.S. Cl. ........................................ 182/115
(58) Field of Classification Search .............. 182/100, 182/115, 116, 187
See application file for complete search history.

(56) References Cited

U.S. PATENT DOCUMENTS

| | | | | |
|---|---|---|---|---|
| 1,826,120 A * | 10/1931 | Booth | | 182/46 |
| 3,336,999 A * | 8/1967 | McSwain | | 182/20 |
| 4,056,902 A | 11/1977 | Ziegler et al. | | |
| 4,190,992 A | 3/1980 | Takenaga et al. | | |
| 5,199,527 A * | 4/1993 | Jennings | | 182/187 |
| 5,279,388 A * | 1/1994 | Laughlin et al. | | 182/92 |
| 5,439,074 A * | 8/1995 | Trout et al. | | 182/187 |
| 5,522,186 A | 6/1996 | Jarman | | |
| 5,562,180 A * | 10/1996 | Herzog et al. | | 182/187 |
| 5,632,124 A | 5/1997 | Weingarten et al. | | |
| 5,711,399 A | 1/1998 | Wayne-Prejean | | |
| 5,853,066 A | 12/1998 | Gohn | | |
| 6,053,190 A | 4/2000 | Brown, Jr. et al. | | |
| 6,443,849 B1 | 9/2002 | Byrd | | |
| 6,668,977 B2 | 12/2003 | Arsenault | | |
| 6,725,972 B1 | 4/2004 | Krier et al. | | |
| RE39,725 E * | 7/2007 | Muhich | | 182/187 |
| 7,434,662 B2 * | 10/2008 | McFall et al. | | 182/187 |
| 2002/0112919 A1 | 8/2002 | Graham, Jr. | | |
| 2004/0075037 A1 | 4/2004 | Krier et al. | | |
| 2005/0016795 A1 * | 1/2005 | Skipper | | 182/100 |
| 2008/0149422 A1 | 6/2008 | Lott | | |
| 2009/0095569 A1 | 4/2009 | Cooper et al. | | |
| 2009/0277721 A1 | 11/2009 | Weir | | |

* cited by examiner

*Primary Examiner* — James O Hansen
*Assistant Examiner* — Kristine Florio
(74) *Attorney, Agent, or Firm* — Hammer & Associates, P.C.

(57) ABSTRACT

A tree stand adapted to create a spiral step around a tree includes a trunk connector bracket with a top, a bottom, a first side, and a second side. The trunk connector bracket is adapted to be mounted to a tree by its top being in tension and its bottom being in compression. A first platform is mounted approximate to the bottom of said trunk connector bracket approximate to the first side. A second platform is mounted approximate to the top of the trunk connector bracket approximate to the second side. The first and second platforms create a spiral step.

15 Claims, 8 Drawing Sheets

TREE STAND ADAPTED TO CREATE A SPIRAL STEP AROUND A TREE

FIELD OF INVENTION

The instant application relates to tree stands, and more specifically, to a tree stand adapted to create a spiral step around a tree.

BACKGROUND OF THE INVENTION

A spiral step or a spiral staircase, as used herein, refers to a known spiral step or staircase that winds around a newel, also known as the central pole, or in this case a tree. Spiral stairs typically have a handrail on the outer side only, and on the inner side just the central pole. The term "spiral" is used incorrectly for a staircase from a mathematical viewpoint, as a mathematical spiral lies in a single plane and moves towards or away from a central point. A spiral staircase by the mathematical definition therefore would be of little use as it would afford no change in elevation. The correct mathematical term for motion, where the locus remains at a fixed distance from a fixed line while moving in a circular motion about it, is "helix". However the term spiral stair is commonly used to refer to a "helix" shaped staircase, and as such, the terms are synonymous when used to describe stairs. As such, the terms spiral step and spiral staircase are used herein to describe a helical step or helical staircase Tree stands, also known as deer stands, are open or enclosed platforms positioned on a tree for use by hunters. The platforms are secured to trees in order to elevate the hunter and give the hunter an elevated vantage point, as the hunter may sit or stand up in a tree. This allows the hunter to see over intervening brush and vegetation that might otherwise block the hunter's view of approaching game. Tree stands by their nature of being stands or platforms may allow hunters or other individuals to use them in many different ways. There are three different types of tree stands typically used: climbing stands, ladder stands, and hanging stands.

A climbing stand is used as a device that not only provides a platform for the hunter to stand and/or sit on at an elevated position, but also to help the hunter ascend up the tree to the elevated position. Two parts make up a standard climbing stand. The bottom part is the standing platform and the top is the seat. To climb the tree, the back of each part is angled to the tree one at a time and pulled up. Then the part that the hunter is moving is set back level and the next part is moved up. This is done until the hunter is at the desired height. To go down the hunter does the same as climbing up except goes down. While climbing stands are portable and allow hunters to position the tree stand at various locations, climbing stands can be difficult to operate and can be dangerous. For safety some hunters strap the tree stand to the tree. In addition, only trees that have no limbs up to the height desired for hunting will work.

Ladder stands are a stand with a seat and platform along with the ladder to climb up in the stand. A ladder stand has a seat and platform that connect to the tree with the ladder coming off the front of the platform to give the hunter access to the stand. Ladder stands are stationary because of the size and lack of ability to move. Stability of a ladder stand is an advantage because of the connection to the tree and support from the ground. However, because of the small stature of most ladder stands and the position of the ladder in the front of the platform, getting on and off the ladder stand via the ladder may be very difficult and hazardous, especially for less agile hunters.

Hanging stands are stationary stands that resemble ladder stands without the ladder. Hanging stands connect to the tree with chains or cables at the desired height. To get up to a hanging stand hunters use ladders or sections of ladders secured to the tree (called climbing sticks or tree spikes), or they use screw in steps that screw in the tree and allow the hunter to climb up to the stand. Often ladder stands and hanging stands do not move easily, so they tend to stay on one tree. Because branches limit climbing stand use, ladder stands and hanging stands allow hunters more options on the trees with many branches at a lower height. However, hanging stands, like ladder stands, may be difficult to get in and out of from the ladder, climbing sticks, spikes, etc., and thus may be dangerous.

The instant invention is designed to address all of these problems by providing a tree stand that is easier to get in and out of and thus may be safer.

SUMMARY OF THE INVENTION

The instant invention is a tree stand adapted to create a spiral step around a tree. The tree stand includes a trunk connector bracket with a top, a bottom, a first side, and a second side. The trunk connector bracket is adapted to be mounted to a tree by its top being in tension and its bottom being in compression. A first platform is mounted approximate to the bottom of said trunk connector bracket approximate to the first side. A second platform is mounted approximate to the top of the trunk connector bracket approximate to the second side. The first and second platforms create a spiral step.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
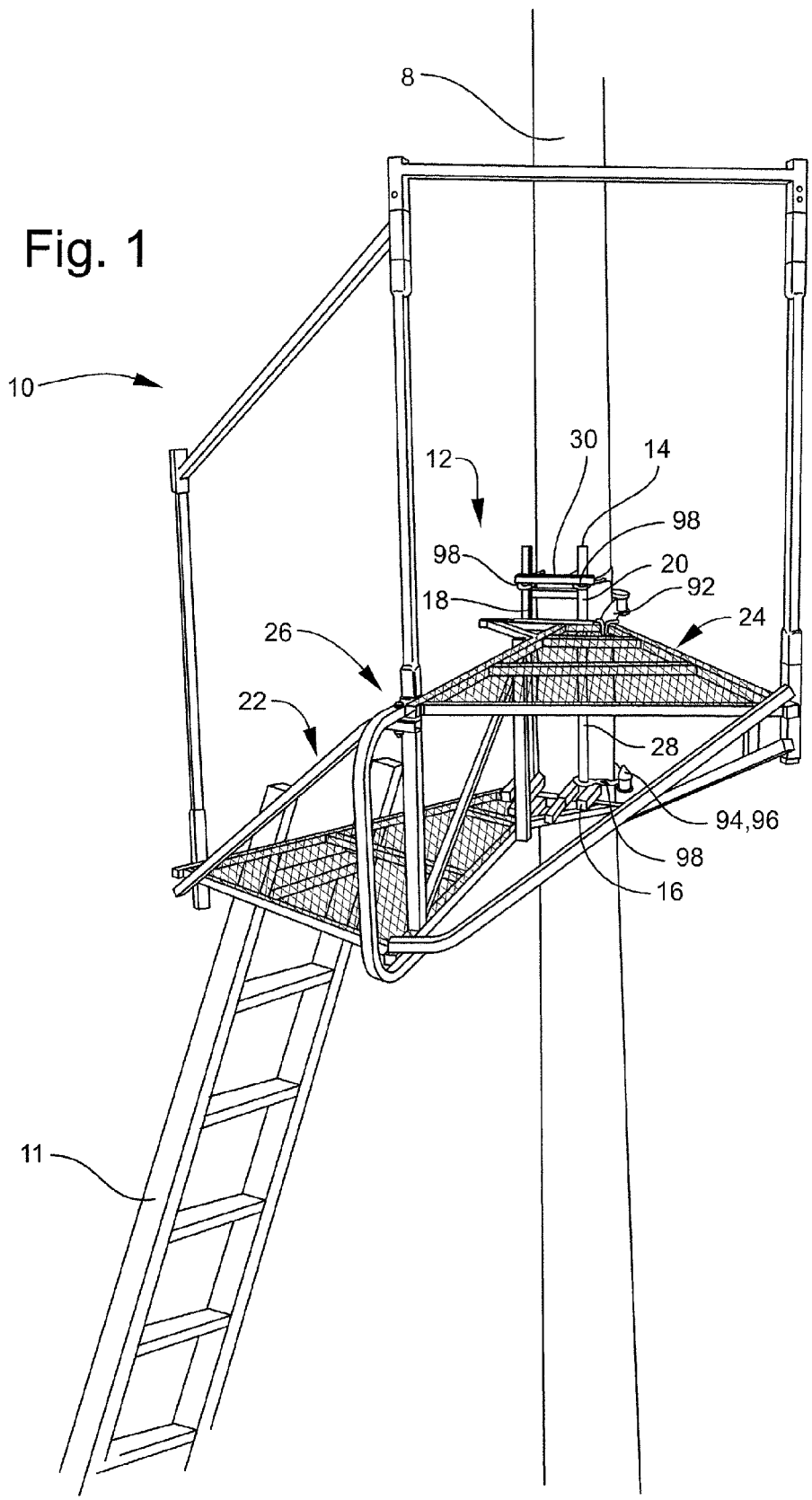
FIG. 1 is an environmental view of one embodiment of the tree stand adapted to create a spiral step around a tree.
Figure 2:
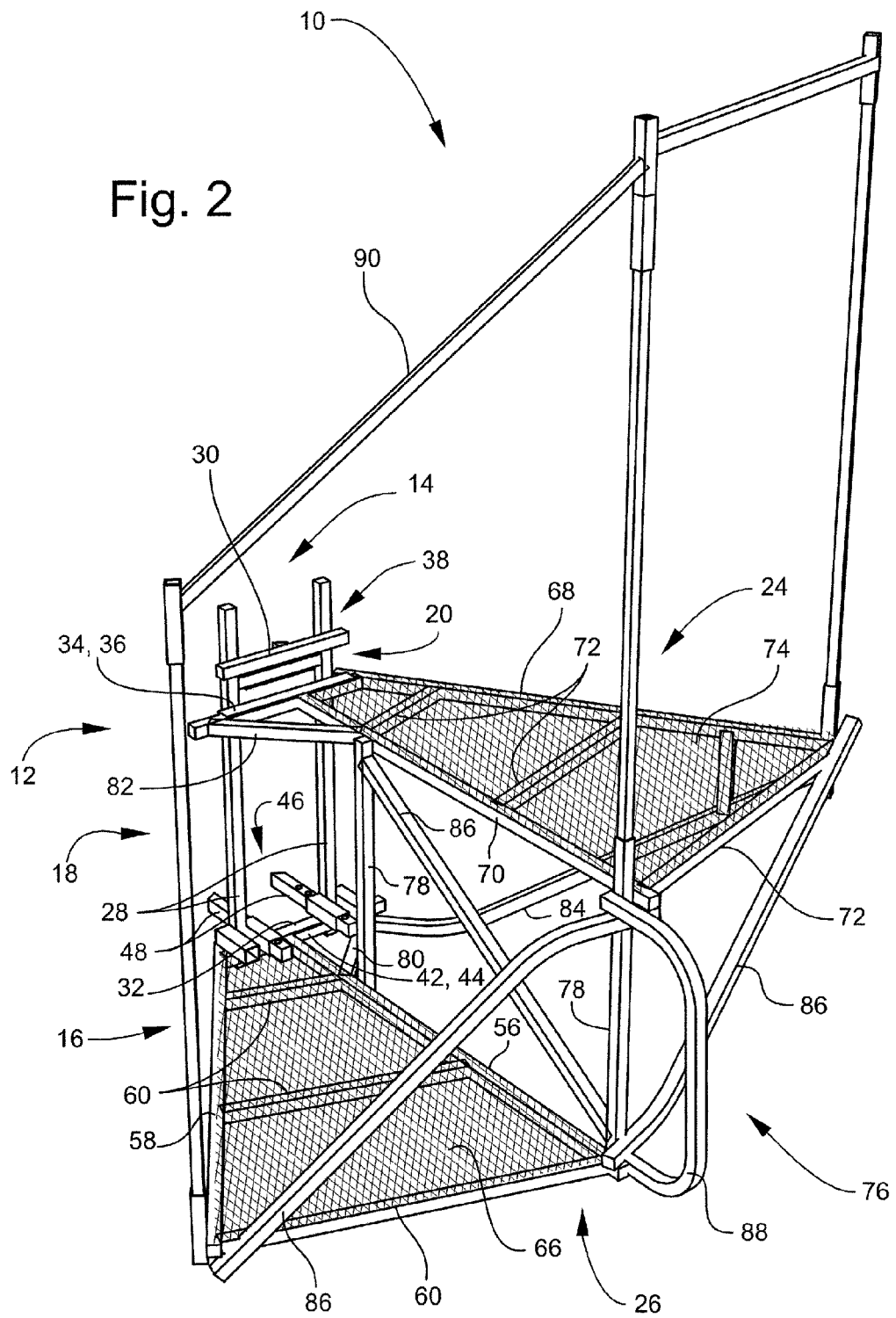
FIG. 2 is a perspective view of the embodiment of the tree stand shown in FIG. 1.
Figure 3:
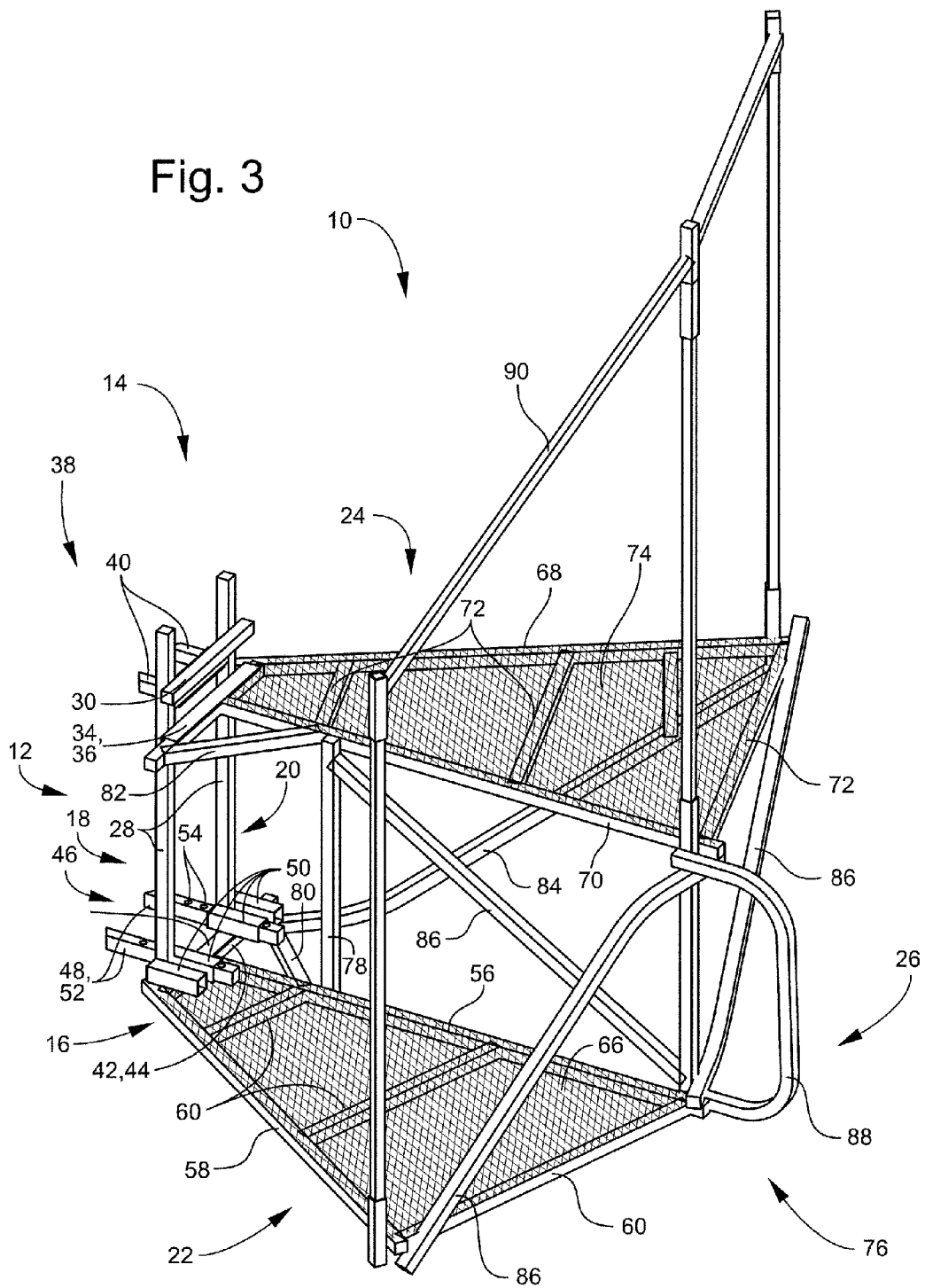
FIG. 3 is another perspective view of the embodiment of the tree stand shown in FIG. 1.
Figure 4:
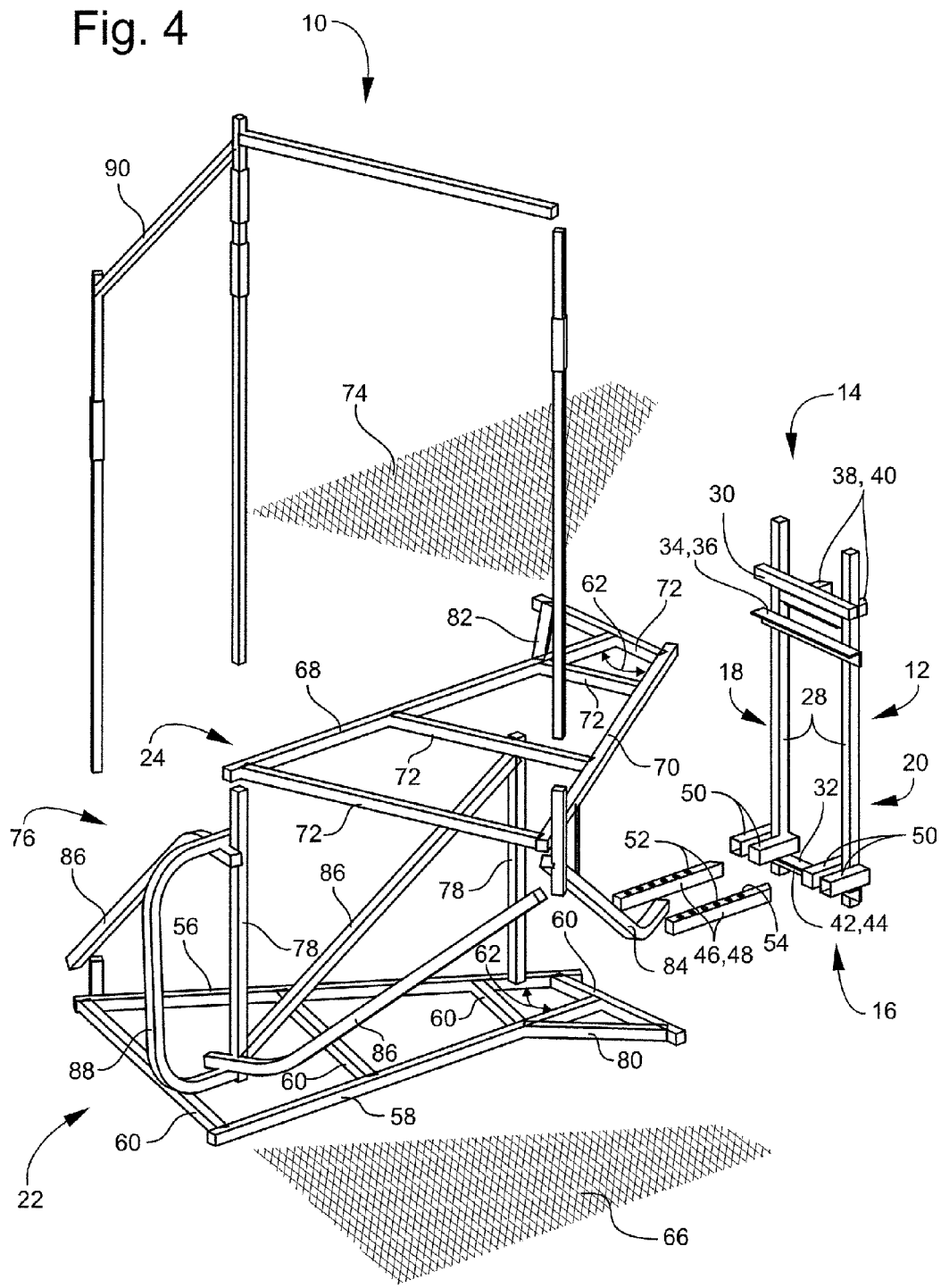
FIG. 4 is a disassembled prospective view of the embodiment of the tree stand shown in FIG. 1.
Figure 5:
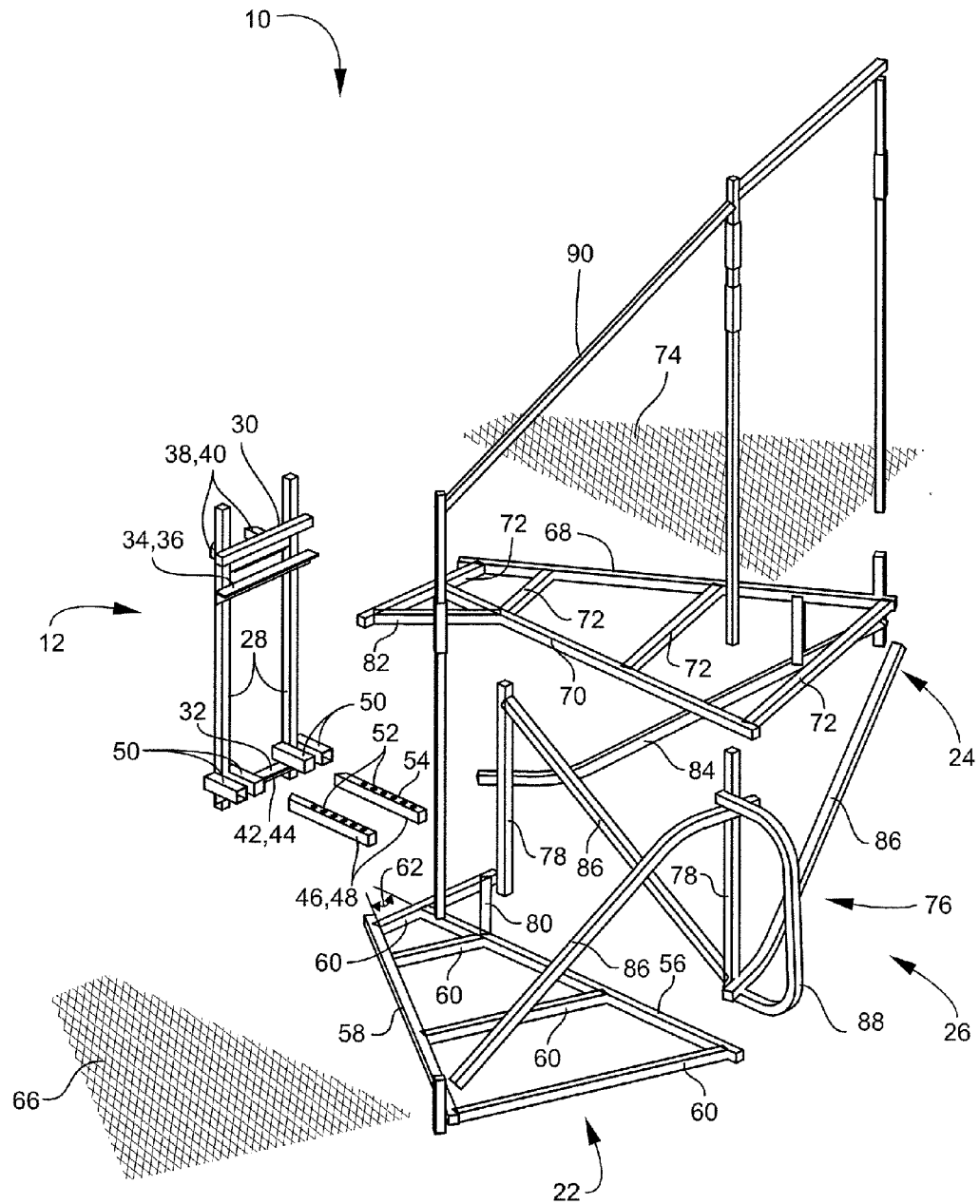
FIG. 5 is another disassembled prospective view of the embodiment of the tree stand shown in FIG. 1.
Figure 6:
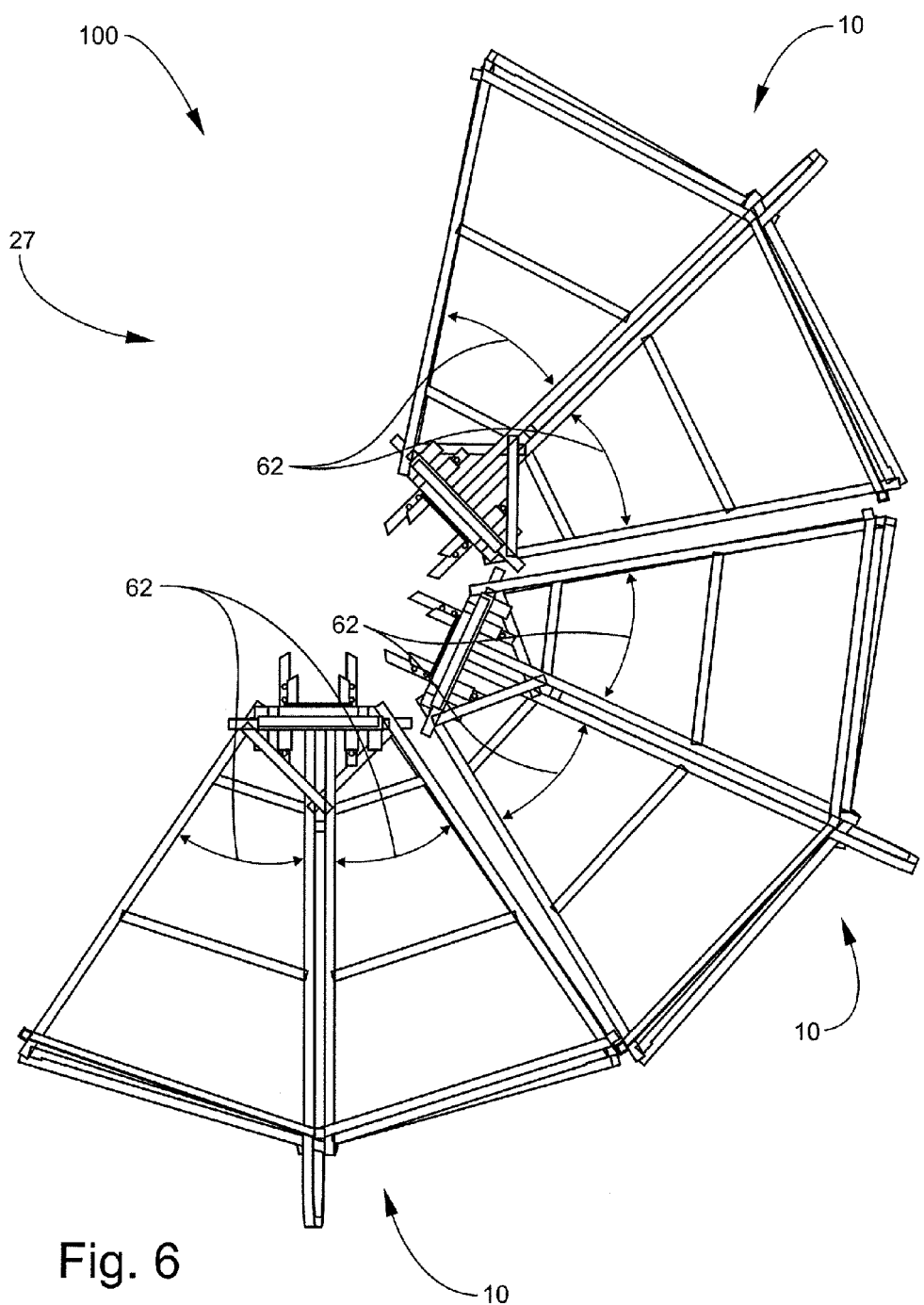
FIG. 6 is a top view of a tree stand system according to the instant invention with a plurality of the tree stands from FIG. 1 positioned to create a spiral staircase.
Figure 7:
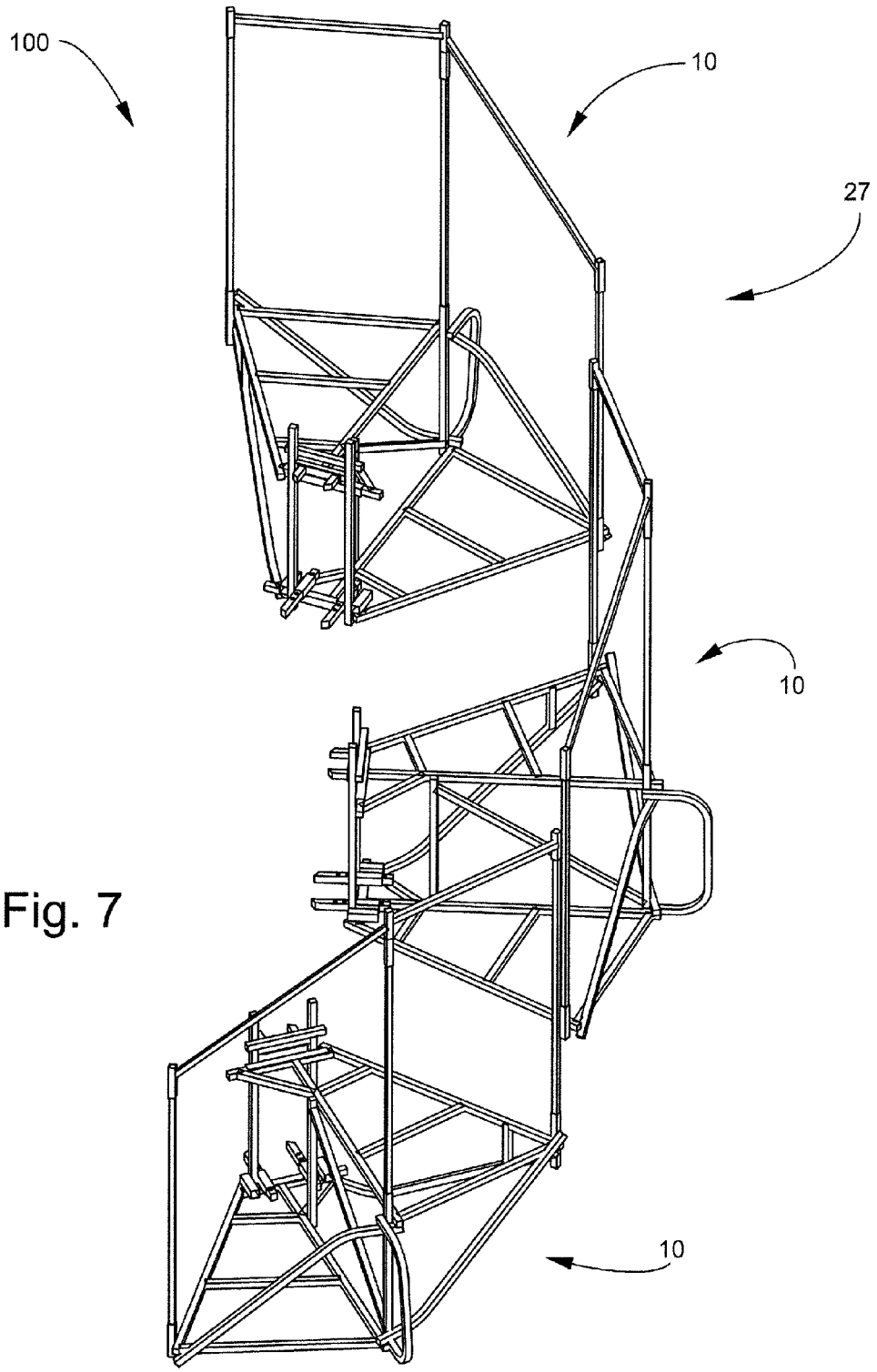
FIG. 7 is a perspective view of the tree stand system from FIG. 6.

Referring to the drawings, wherein like numerals indicate like elements, there is shown in FIG. 1 an embodiment of a tree stand 10. Tree stand 10 may be mounted on a tree 8 or other vertical objects, like poles, structures, etc. Tree stand 10 may be utilized to provide an elevated position on tree 8 or other vertical objects for a hunter to gain a better vantage point. Tree stand 10 may create a spiral step 26 around tree 8 or any other vertical object. Tree stand 10 may provide a safer and easier path to get in and out of the tree stand than other tree stands. As shown in FIG. 1, a ladder 11 may be placed at the side of tree stand 10 for easy access to the platforms of tree stand 10. In addition, as shown in FIGS. 6 and 7, a plurality of tree stands 10 may be used in conjunction for creating a spiral staircase around tree 8 or any other vertical object. Tree stand 10 may generally include: a trunk connector bracket 12, a first platform 22, and a second platform 24. These parts will be described in detail below.

Trunk connector bracket 12 may be included in tree stand 10. Trunk connector bracket 12 may be for mounting tree stand 10 to tree 8. Trunk connector bracket 12 may be any apparatus for mounting tree stand 10 to tree 8 or any other vertical object. Trunk connector bracket 12 may have a top 14, a bottom 16, a first side 18, and a second side 20. Trunk connector bracket 12 may be adapted to be mounted to a tree by its top 14 being in tension and its bottom 16 being in compression. In the embodiment shown in the Figures, trunk connector bracket 12 may include two vertical members 28 being interconnected approximate to top 14 by a top cross member 30, and being interconnected approximate to bottom 16 by a bottom cross member 32. However, trunk connector bracket 12 is not so limited and may include any structure or frame adapted to position tree stand 10 on tree 8 via the top of the structure being in tension and the bottom of the structure being in compression.

A first platform 22 may be included in tree stand 10. First platform 22 may be for providing a first platform on tree stand 10 for a hunter or other person to stand or sit. First platform 22 may be mounted to trunk connector bracket 12. First platform 22 may be mounted to trunk connector bracket 12 by any means, including, but not limited to, via welds, nails, screws, adhesives, mounting brackets, etc. In one embodiment, first platform 22 may be mounted to trunk connector bracket 12 approximate to its bottom 16 and approximate to its first side 18.

A second platform 24 may be included in tree stand 10. Second platform 24 may be for providing a second platform on tree stand 10 for a hunter or other person to stand or sit. Second platform 24 may be mounted to trunk connector bracket 12. Second platform 24 may be mounted to trunk connector bracket 12 by any means, including, but not limited to, via welds, nails, screws, adhesives, mounting brackets, etc. In one embodiment, second platform 24 may be mounted to trunk connector bracket 12 approximate to its top 14 and approximate to its second side 20. Although second platform 24 is described to be mounted approximate to top 14 and second side 20 and first platform 22 is described to be mounted to bottom 16 and first side 18, these are interchangeable, i.e. second platform 24 may be mounted approximate to bottom 16 and first side 18 and first platform 22 may be mounted to top 14 and second side 20.

In combination, first platform 22 and second platform 24 may create a spiral step 26 in tree stand 10. Spiral step 26 may be a standard spiral step with tree 8 serving as the newel or central pole. Although, tree stand 10 is shown in FIGS. 1-5 as going vertically up counter-clockwise, the invention is not so limited, and the platforms may be rearranged to create a spiral step 26 going vertically up clockwise. As shown in FIGS. 6 and 7, when multiple tree stands 10 are positioned together, multiple spiral steps 26 are created thereby providing a spiral staircase 27. The spiral steps 26 may not only be created by the first and second platforms within each tree stand 10, but also by the second platform 24 of a lower tree stand and the first platform 22 of a subsequent higher tree stand. The distance between first platform 22 and second platform 24 may be any distance and may vary depending on the desired size of tree stand 10. In one embodiment, the distance between first platform 22 and second platform 24, i.e., the height of spiral step 26 may be from 8 to 24 inches. In another embodiment, the distance between first platform 22 and second platform 24, i.e., the height of spiral step 26 may be from 12 to 20 inches. In yet another embodiment, the distance between first platform 22 and second platform 24, i.e., the height of spiral step 26 may be approximately 16 inches.

First and second platforms 22 and 24 may be mounted to tree trunk connector bracket 12 by any means. In one embodiment, trunk connector bracket 12 may include a first platform mount 42 for mounting first platform 22 to trunk connector bracket 12. First platform mount 42 may be any device for mounting first platform 22 to trunk connector bracket 12. First platform mount 42 may be positioned anywhere on trunk connector bracket 12 for mounting first platform 22, including, but not limited to, interconnecting the two vertical members 28 approximate to the bottom 16 of trunk connector bracket 12. In one embodiment, first platform mount 42 may be a second L-shaped bracket 44 positioned below bottom cross member 32. Trunk connector bracket 12 may also include a second platform mount 34 for mounting second platform 24 to trunk connector bracket 12. Second platform mount 34 may be any device for mounting second platform 24 to trunk connector bracket 12. Second platform mount 34 may be positioned anywhere on trunk connector bracket 12 for mounting second platform 24, including, but not limited to, interconnecting the two vertical members 28 approximate to the top 14 of trunk connector bracket 12. In one embodiment, second platform mount 34 may be a first L-shaped bracket 36 positioned below top cross member 30.

Tree stand 10 may be mounted to tree 8 or any other vertical member by trunk connector bracket 12 being in tension at the top 14 and being in compression at bottom 16. For aiding in the grip of tree 8, trunk connector bracket 12 may optionally include a bottom tree gripping member 46 and/or a top tree gripping member 38. Bottom tree gripping member 46 may be attached to trunk connector bracket 12 approximate to the bottom 16 on the opposite side of trunk connector bracket 12 from first platform 22. Top tree gripping member 38 may be attached to trunk connector bracket 12 approximate to the top 14 on the opposite side of trunk connector bracket 12 from second platform 24. In one embodiment, the bottom tree gripping member 46 may be a second pair of pointed members 48 extending from trunk connector bracket 12, and top tree gripping members 38 may be a first pair of pointed members 40 extending from trunk connector bracket 12. As shown in the Figures, the second pair of pointed members 48 of bottom tree gripping members 46 may be adjustable in length and width from trunk connector bracket 12. Each of these adjustable second pair of pointed members 48 may include a stationary member 50 and an adjustable member 52. The stationary members 50 may be attached to trunk connector bracket 12, and the adjustable members 52 may be adapted to slide within the stationary members 50. To lock the adjustable members 52 in place in the stationary members 50, the adjustable members 52 may have a plurality of holes 54. In this embodiment, each adjustable member 52 may slide within the respective stationary members 50 to a desired length from the trunk connector bracket 12 where one of the plurality of holes 54 may be used to fix the adjustable member 52 to the stationary member 50. The members may be fixed by any means, including, but not limited to, pins, screws, nails, etc. In one embodiment, the trunk connector bracket 12 may include two pairs of stationary members 50 for varying the width between the second pair of pointed members 48. This optional adjustment feature of bottom tree gripping member 46 may allow for better mounting options for different size and shapes of trees 8. Although not shown in the figures, top tree gripping members 38 may also be adjustable as described and shown for bottom tree gripping members 46.

The first platform 22 may be a platform adapted for holding a person, hunter, etc. or equivalent weight. First platform 22 may be constructed by any means adapted for holding the equivalent weight of a person, hunter, etc. In one embodiment, first platform 22 may include: a first right member 56, a first left member 58, a plurality of first interconnecting members 60 and a first pie shaped surface 66. The length of first platform 22 may be any desired length and may vary depending on the size and shape of the tree to be mounted on. In one embodiment, the length of first platform 22 may be from 18 to 48 inches. In another embodiment, the length of first platform 22 may be from 25-35 inches. In yet another embodiment, the length of first platform 22 may be approximately 30 inches. The first right member 56 may be positioned at an angle 62 from first left member 58 to create a first pie shaped platform. Angle 62 may be any desired angle and may vary depending on the size and shape of the tree to be mounted on. In one embodiment, angle 62 may be between 18 and 45 degrees. In another embodiment, angle 62 may be between 25 and 35 degrees. In yet another embodiment, angle 62 may be approximately 32 degrees. The plurality of first interconnecting members 60 may provide support for first pie shaped surface 66 which may expand the distance from first right member 56 to first left member 58. First pie shaped surface 66 may be made of any material capable of holding the desired weight, including, but not limited to, steel, aluminum, wood, plastic, etc. For example, first pie shaped surface 66 may be made from an expanded metal material with any type of surface, including, but not limited to, FRP (fiber reinforced plastic) grating, composite, etc.

The second platform 24 may also be a platform adapted for holding a person, hunter, etc. or equivalent weight. Second platform 24 may be constructed by any means adapted for holding the equivalent weight of a person, hunter, etc. In one embodiment, second platform 24 may include: a second right member 68, a second left member 70, a plurality of second interconnecting members 72 and a second pie shaped surface 74. The length of second platform 24 may be any desired length and may vary depending on the size and shape of the tree to be mounted on. In one embodiment, the length of second platform 24 may be from 18 to 48 inches. In another embodiment, the length of second platform 24 may be from 25-35 inches. In yet another embodiment, the length of second platform 24 may be approximately 30 inches. Second platform 24 may be the same length as first platform 22, but may also be of a shorter or longer length if desired. The second right member 68 may be positioned at an angle 62 from second left member 70, similar to in first platform 22, to create a second pie shaped platform. However these angles may vary if desired. The plurality of second interconnecting members 72 may provide support for second pie shaped surface 74 which may expand the distance from second right member 68 to second left member 70. Second pie shaped surface 74 may be made of any material capable of holding the desired weight, including, but not limited to, steel, aluminum, wood, plastic, etc. For example, second pie shaped surface 74 may be made from an expanded metal material with any type of surface, including, but not limited to, FRP (fiber reinforced plastic) grating, composite, etc.

Tree stand 10 may include a plurality of support braces 76 for supporting first and second platforms 22 and 24 in position on trunk connector bracket 12. Support braces 76 may include any number of support braces and may be arranged in any fashion for supporting first and second platforms 22 and 24. In the embodiments shown in the Figures, support braces 76 may include: a plurality of vertical braces 78 interconnecting first platform 22 and second platform 24; a first horizontal angled brace 80 interconnecting first platform 22 with trunk connector bracket 12 adapted for maintaining first platform 22 at a fixed angle with trunk connector bracket 12; a second horizontal angled brace 82 interconnecting second platform 24 with trunk connector bracket 12 adapted for maintaining second platform 24 at a fixed angle with trunk connector bracket 12; a first vertical angled brace 84 interconnecting the bottom of the second platform 24 with the bottom 16 of the trunk connector bracket 12; a plurality of second vertical angled braces 86 interconnecting the top of the first platform 22 with the bottom of the second platform 24; and an end brace 88 interconnecting the first and second platforms 22 and 24 at their ends opposite of the trunk connector bracket 12.

A shooting rail 90 may optionally be included with tree stand 90. Shooting rail 90 may be for providing a shooting rail on the outside of tree stand 10 for aiding a hunter in aiming his or her firearm. Shooting rail may also be for attachment of materials to create blind for concealment (blind material may be fabric or real or artificial tree limbs). Shooting rail 90 may be any height from tree stand 10 as desired. In one embodiment, shooting rail 90 may have a height from 24 to 42 inches. In another embodiment, shooting rail 90 may have a height of approximately 30 inches. Shooting rail 90 may angle at the same angle as the incline from first platform 22 to second platform 24. Shooting rail 90 may be set at a fixed distance above the first and second platforms, but also may be adjustable if desired. For example, shooting rail 90 may include telescoping legs for allowing the height of the shooting rail to be adjusted. In addition to being a shooting rail, shooting rail 90 may also serve as a hand rail for helping a user maintain balance on tree stand 10, similar to a standard handrail on a spiral staircase.

Support braces 76, shooting rail 90 and trunk connector bracket 12 may be made out of any material adapted for holding the desired weight on first and second platforms 22 and 24. These materials may include steel, aluminum, plastic, wood, etc. In one embodiment, the support braces 76, shooting rail 90, and trunk connector bracket 12 may be made out of a metal tubing being cut, bent and welded together in the configuration shown in FIGS. 1-5. In one embodiment, the metal tubing may be 1" or larger and varying gages (18 gage, 16 gage, 14 gage, etc.). In another embodiment, the metal tubing may be ¾" 16 gage square tubing.

A top strap 92 and a bottom strap 94 may be included in tree stand 10. Top strap 92 and bottom strap 94 may allow tree stand 10 to be mounted to tree 8 or any other vertical member by trunk connector bracket 12 being in tension at the top 14 and being in compression at bottom 16. Top strap 92 may be adapted to wrap around a tree or other vertical member and connect to the trunk connector bracket 12 approximate the top 14. Bottom strap 94 may be adapted to wrap around a tree or other vertical member and connect to the trunk connector bracket 12 approximate to the bottom 16. Top strap 92 and bottom strap 94 may be any straps adapted to provide tension on the top 14 of trunk connector bracket 12 and compression on the bottom 16 of bracket 12. For example, top strap 92 and bottom strap 94 may be come-a-long straps 96. Come-a-long straps 96 may be straps, chains, wires, etc. with a winch type device adapted for shortening the distance. Top and bottom straps 92 and 94 may be adapted to attach to trunk connector bracket 12 by any means. In one embodiment, top and bottom straps 92 and 94 may include hooks 98 adapted to hook around the vertical members 28 of trunk connector bracket 12.

The instant invention also includes a tree stand system 100 as shown in FIGS. 6 and 7. Tree stand system 100 includes a plurality of tree stands 10 adapted to create a spiral staircase 27. The number of tree stands 10 included in tree stand system 100 may be any number, and may vary depending on the length and height desired of spiral staircase 27. Although, tree stand system 100 is shown in FIGS. 6 and 7 as going vertically up counter-clockwise, the invention is not so limited, and the parts may be rearranged to create a spiral staircase that goes vertically up clockwise. The plurality of tree stands 10 may be positioned where the second platform 24 of a lower tree stand and the first platform 22 of a subsequent higher tree stand create a spiral step. However, the invention is not so limited. Optionally, tree stand system 10 may include a plurality of ladder members adapted to connect the second platform of a lower tree stand with the first platform of an upper tree stand. Ladder member may allow for a longer and higher spiral staircase 27 with less tree stands 10 required. As an example, tree stands 10 can be simultaneously provided in both counter clockwise and clockwise orientations in order to merge together on opposite side of a tree, where as tree stands 10 can be configured such that both platforms are oriented at the top of the trunk connector bracket 12 to create a "crow's nest".

As shown in FIGS. 1-7, tree stand 10 includes a first and second platform 22 and 24 mounted on a single trunk connector bracket 12. However, the invention is not so limited. First platform 22 may be mounted on a separate trunk connector bracket 12 from second platform 24. This means that a single platform may be provided on the trunk connector brackets 12. This also means that multiple tree stands 10 must be mounted to tree 8 to provide spiral step 26. The advantage to this arrangement with a single platform on trunk connector bracket 12 is more flexibility in the positioning of tree stand 10 and a less compact size. The disadvantage being that twice as many tree stands must be mounted on the tree.

Figure 8:
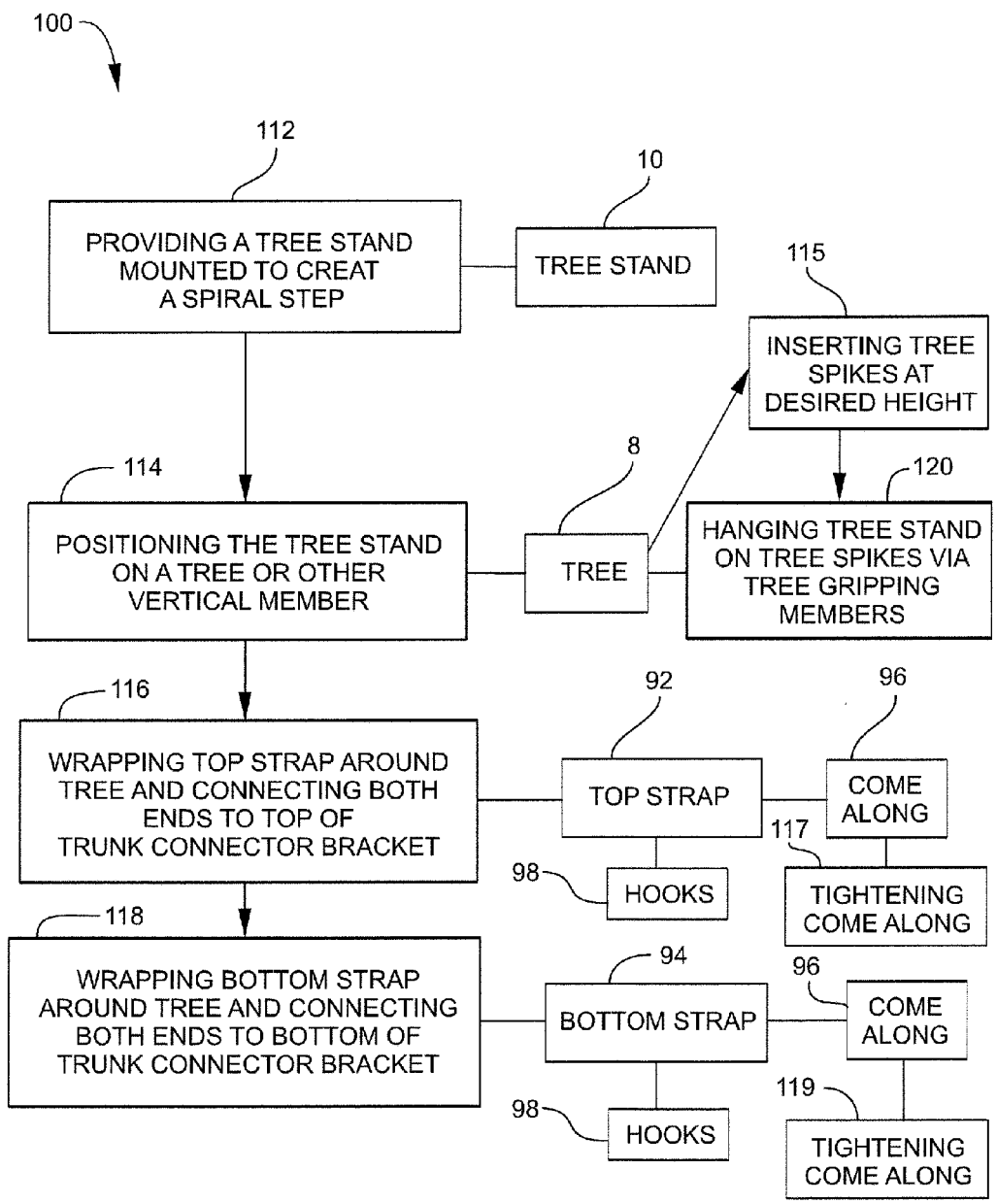
FIG. 8 is a flow diagram of one embodiment of the method of creating a spiral staircase around a tree according to the instant invention.

The instant invention also includes a method 110 of creating a spiral step around a tree, as shown in FIG. 8. Method 110 of creating a spiral step around a tree may include any steps for creating a spiral step around a tree that includes the use of tree stand 10. Method 110 may include a step 112 of providing a tree stand 10, as described above. Method 110 may also include the following steps: a step 114 of positioning the tree stand 10 on a tree; a step 116 of wrapping a top strap 92 around the tree and connecting both ends of the top strap 92 to the top 14 of the trunk connector bracket 12; and a step 118 of wrapping a bottom strap 94 around the tree and connecting both ends of the bottom strap 94 to the bottom 16 of trunk connector bracket 12. The step 114 of positioning the tree stand 10 on a tree may include any steps for positioning the tree stand 10 on the tree, including, but not limited to, a step 115 of inserting tree spikes (or other similar devices) into the tree at a desired height, and a step 120 of hanging the tree stand 10 on the tree spikes (or other similar devices) via the tree gripping members (38 and/or 40). The steps 116 and 118 of wrapping top strap 92 and bottom strap 94 around the tree, respectively, may also include the steps 117 and 119, respectively, of tightening the come-a-long straps 96.

The present invention may be embodied in other forms without departing from the spirit and the essential attributes thereof, and, accordingly, reference should be made to the appended claims, rather than to the foregoing specification, as indicated in the scope of the invention.

I claim:

1. A tree stand adapted to create a spiral step around a tree comprising:
   a trunk connector bracket including a top, a bottom, a first side, and a second side;
   said trunk connector bracket being adapted to be mounted to a tree by its top being in tension and its bottom being in compression;
   a first platform mounted to said trunk connector bracket approximate to said bottom and to said first side;
   a second platform mounted to said trunk connector bracket approximate to said top and said second side;
   said first and second platforms creating a spiral step;
   a plurality of support braces for supporting said first and second platforms in position on said trunk connector bracket;
   said plurality of support braces including:
      a plurality of vertical braces interconnecting said first platform and said second platform;
      a first horizontal angled brace interconnecting said first platform with said trunk connector bracket adapted for maintaining said first platform at a fixed angle with said trunk connector bracket;
      a second horizontal angled brace interconnecting said second platform with said trunk connector bracket adapted for maintaining said second platform at a fixed angle with said trunk connector bracket;
      a first vertical angled brace interconnecting the bottom of said second platform with the bottom of said trunk connector bracket;
      a plurality of second vertical angled braces interconnecting the top of said first platform with the bottom of said second platform; and
      an end brace interconnecting the first and second platforms at their ends opposite of said trunk connector bracket.

2. The tree stand adapted to create a spiral step around a tree of claim 1 wherein said trunk connector bracket comprises:
   two vertical members;
   said vertical members being interconnected approximate to said top by a top cross member; and
   said vertical members being interconnected approximate to said bottom by a bottom cross member.

3. The tree stand adapted to create a spiral step around a tree of claim 2 wherein said trunk connector bracket further comprises:
   a first platform mount interconnecting said two vertical members approximate to said bottom of said trunk connector bracket, said first platform mount being adapted to mount said first platform to said trunk connector bracket; and
   a second platform mount interconnecting said two vertical members approximate to said top of said trunk connector bracket, said second platform mount being adapted to mount said second platform to said trunk connector bracket.

4. The tree stand adapted to create a spiral step around a tree of claim 3 wherein:
   said first platform mount being a second L-shaped bracket positioned below said bottom cross member; and
   said second platform mount being a first L-shaped bracket positioned below said top cross member.

5. The tree stand adapted to create a spiral step around a tree of claim 2 wherein said trunk connector bracket further comprises:

a bottom tree gripping member attached to said trunk connector bracket approximate to said bottom on the opposite side of said trunk connector bracket from said first platform; and a top tree gripping member attached to said trunk connector bracket approximate to said top on the opposite side of said trunk connector bracket from said second platform.

6. The tree stand adapted to create a spiral step around a tree of claim 5 wherein:

said bottom tree gripping member being a second pair of pointed members extending from said trunk connector bracket; and said top tree gripping member being a first pair of pointed members extending from said trunk connector bracket.

7. The tree stand adapted to create a spiral step around a tree of claim 6 wherein said second pair of pointed members being adjustable in length from said trunk connector bracket.

8. The tree stand adapted to create a spiral step around a tree of claim 7 wherein each of said adjustable second pair of pointed members including:

a stationary member attached to said trunk connector bracket; and an adjustable member adapted to slide within said stationary member having a plurality of holes;

whereby, said adjustable members may slide within said stationary member to a desired length from said trunk connector bracket where one of said plurality of holes may be used to fix said adjustable member to said stationary member.

9. The tree stand adapted to create a spiral step around a tree of claim 8 wherein said trunk connector bracket comprises two pairs of stationary members for varying the distance between said second pair of pointed members.

10. The tree stand adapted to create a spiral step around a tree of claim 1 wherein:

said first platform comprising:
a first right member;
a first left member;
said first right member being positioned at an angle from said first left member to create a first pie shaped platform;
a plurality of first interconnecting members; and
a first pie shaped surface expanding from said first right member to said first left member;

said second platform comprising:
a second right member;
a second left member;
said second right member being positioned at an angle from said second left member to create a second pie shaped platform;
a plurality of second interconnecting members; and
a second pie shaped surface expanding from said second right member to said second left member.

11. The tree stand adapted to create a spiral step around a tree of claim 1 further comprising a shooting rail.

12. The tree stand adapted to create a spiral step around a tree of claim 1 further comprising:

a top strap adapted to wrap around a tree or other vertical member and connect to said trunk connector bracket approximate said top; and a bottom strap adapted to wrap around a tree or other vertical member and connect to said trunk connector bracket approximate said bottom.

13. The tree stand adapted to create a spiral step around a tree of claim 12 wherein said top strap and said bottom straps being come-along straps.

14. The tree stand adapted to create a spiral step around a tree of claim 12 wherein said straps including hooks adapted to hook around said vertical members of said trunk connector bracket.

15. A tree stand system adapted for creating a spiral staircase around a tree comprising:

a plurality of tree stands according to claim 1 mounted to a tree;

wherein, each tree stand being positioned where each tree stand is offset from the tree stand below it, thereby creating a spiral staircase around the tree.

* * * * *